US007962900B2

(12) United States Patent
Barraclough et al.

(10) Patent No.: US 7,962,900 B2
(45) Date of Patent: Jun. 14, 2011

(54) CONVERTING PROGRAM CODE WITH ACCESS COORDINATION FOR A SHARED MEMORY

(75) Inventors: Gavin Barraclough, Manchester (GB); Paul Knowles, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 11/219,467

(22) Filed: Sep. 2, 2005

(65) Prior Publication Data

US 2006/0277532 A1 Dec. 7, 2006

(30) Foreign Application Priority Data

Jun. 6, 2005 (GB) .................................. 0511462.4

(51) Int. Cl.
*G06F 9/44* (2006.01)
*G06F 9/46* (2006.01)
(52) U.S. Cl. ......... 717/128; 717/106; 717/114; 718/102
(58) Field of Classification Search .................... None
See application file for complete search history.

(56) References Cited

U.S. PATENT DOCUMENTS

| | | | | |
|---|---|---|---|---|
| 6,101,524 | A * | 8/2000 | Choi et al. ..................... | 718/102 |
| 6,223,335 | B1 | 4/2001 | Cartwright, Jr. et al. | |
| 6,360,194 | B1 | 3/2002 | Egolf | |
| 7,178,062 | B1 * | 2/2007 | Dice ............................... | 714/38 |
| 7,284,238 | B2 * | 10/2007 | Inagaki et al. ................ | 717/128 |
| 7,516,453 | B1 * | 4/2009 | Bugnion ........................... | 718/1 |
| 2002/0120428 | A1 * | 8/2002 | Christiaens ................... | 702/186 |
| 2003/0056200 | A1 * | 3/2003 | Li et al. .......................... | 717/128 |
| 2003/0066056 | A1 | 4/2003 | Petersen et al. | |
| 2004/0054517 | A1 | 3/2004 | Altman et al. | |
| 2004/0059563 | A1 | 3/2004 | Motyka et al. | |
| 2005/0251639 | A1 * | 11/2005 | Vishin et al. .................. | 711/168 |
| 2005/0283781 | A1 * | 12/2005 | Karp et al. .................... | 718/100 |
| 2006/0161919 | A1 * | 7/2006 | Onufryk et al. .............. | 718/102 |
| 2010/0242026 | A1 * | 9/2010 | Bates et al. ................... | 717/128 |

FOREIGN PATENT DOCUMENTS

EP  0 943 993 A2  9/1999

OTHER PUBLICATIONS

"Deterministic Replay of Java Multithreaded Applications", Choi et al., 1998, 12 pages, <portal.acm.org/citation.cfm?id=281041>.*
"Message caching for local and global resource optimization in shared virtual environments", Trefftz et al., Oct. 2000, pp. 97-102, <http://delivery.acm.org/10.1145/510000/502409/p97-trefftz.pdf>.*

(Continued)

*Primary Examiner* — Thuy Dao
(74) *Attorney, Agent, or Firm* — Matthew B. Talpis; Gregory K. Goshorn; Greg Goshorn, P.C.

(57) ABSTRACT

A dynamic binary translator 19 converts a subject program 17 into target code 21 on a target processor 13. For a multi-threaded subject environment, the translator 19 provides a global token 501 common to each thread 171, 172, and one or more sets of local data 502, which together are employed to coordinate access to a memory 18 as a shared resource. Adjusting the global token 501 allows the local datastructures 502*a,b* in each thread to detect potential interference with the shared resource 18.

34 Claims, 7 Drawing Sheets

OTHER PUBLICATIONS

"Modeling Shared Resource Contention Using a Hybrid Simulation/Analytical Approach", Bobrek et al., Feb. 2004, 6 pages, <http://delivery.acm.org/10.1145/970000/969159/208521144.pdf>.*

Duesterwald, Design and engineering of a dynamic binary optimizer, Proceedings of the IEEE, 2005, vol. 93(2), pp. 436-448.

Ebcioglu et al., DAISY: dynamic compilation for 100% architectural compatibility, Proceedings of ISCA '97, 1997, pp. 26-37.

Harris et al., A practical multi-word compare-and-swap operation, Distributed Computing, 16th International Conference, DISC 2002, Proceedings (lecture Notes in Computer Science vol. 2508), 2002, pp. 265-279.

PowerPC Processor Reference Guide. Retrieved from http://www.xilinx.com/bvdocs/userguides/ppc_ref_guide.pdf#search=%22PowerPc%20processor%20reference%20guide%22>, Sep. 2, 2003.

Reinholtz, Atomic Reference Counting Pointers, C/C++ Users Journal. Retrieved from http://www.ddj.com/article/printableArticle.jhtml?articleID=184401888&dept_url=/dept/architect/> on Sep. 28, 2006, pp. 1-9.

* cited by examiner

CONVERTING PROGRAM CODE WITH ACCESS COORDINATION FOR A SHARED MEMORY

BACKGROUND OF INVENTION

1. Field of the Invention

The present invention relates generally to the field of computers and computer software and, more particularly, to program code conversion methods and apparatus useful, for example, in code translators, emulators and accelerators which convert program code.

2. Description of Related Art

In both embedded and non-embedded CPUs, there are predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such CPUs would benefit from a software-oriented processor co-architecture.

Program code conversion methods and apparatus to facilitate such acceleration, translation and co-architecture capabilities are disclosed, for example, in published application WO00/22521, the disclosure of which is incorporated hereby by reference herein.

SUMMARY OF THE INVENTION

Embodiments of the present invention are particularly concerned with program code conversion, whereby a subject program is converted into target code executable by a target processor in a target computing platform.

Performing program code conversion inevitably brings overheads in the conversion process, compared with native execution of the subject program on a subject processor. It is generally desirable to reduce this overhead in the conversion process. Also, it is generally desired to produce target code which executes correctly and efficiently on a target processor.

A thread is a portion of a program that can run independently of, and concurrently with, other portions of the program. In a multi-threaded processing environment, more than one thread (or more than one processor) has access to a shared resource, such as memory. A mechanism for coordinating access to the shared resource is usually required, in order to avoid interference such as conflicts or unexpected behaviour. For example, unintentional interference can arise when two threads independently update data at a particular memory location. The access coordination mechanism is usually specific to the instruction set architecture of the subject processor. In many cases, the subject access coordination mechanism is not readily implemented on a target processor following program code conversion. Firstly, the target processor may have no hardware-based coordination mechanism. Secondly, the target coordination mechanism may operate differently to the subject mechanism. In both of these examples, there is a difficulty in providing an adequate substitute for the subject access coordination mechanism that is expected by the subject code.

According to the present invention there is provided an apparatus and method as set forth in the appended claims. Preferred features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In one aspect of the present invention there is provided a method of providing an access coordination mechanism of a shared resource, for use in program code conversion from subject code having multiple subject threads into target code executable by a target processor, the method including steps of: (a) providing a plurality of local datastructures each associated with one of the multiple subject threads, and a global token common to each of the subject threads; (b) decoding the subject code to identify a subject setting instruction which sets a subject access coordination mechanism in relation to a shared resource, and a subject checking instruction which checks the subject access coordination mechanism; (c) in response to the subject setting instruction, generating target code for adjusting the global token, and storing at least a local token in the local datastructure for a current thread, wherein the local token is derived from the adjusted global token; (d) in response to the subject checking instruction, generating target code for comparing at least the stored local token against the global token to determine potential interference with the shared resource.

In example embodiments, the inventors have developed methods directed at expediting program code conversion, which are particularly useful in connection with a run-time translator which provides dynamic binary translation of subject program code into target code.

The present invention also extends to a translator apparatus having a translator unit arranged to perform any of the methods defined herein. Also, the present invention extends to computer-readable storage medium having recorded thereon instructions implementable by a computer to perform any of the methods defined herein.

DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

In the terminology below, a subject program is intended to execute on a subject computing platform including a subject processor. A target computing platform including a target processor is used to execute the subject program, through a translator which performs dynamic program code conversion. The translator performs code conversion from subject code to target code, such that the target code is executable on the target computing platform.

Figure 1:
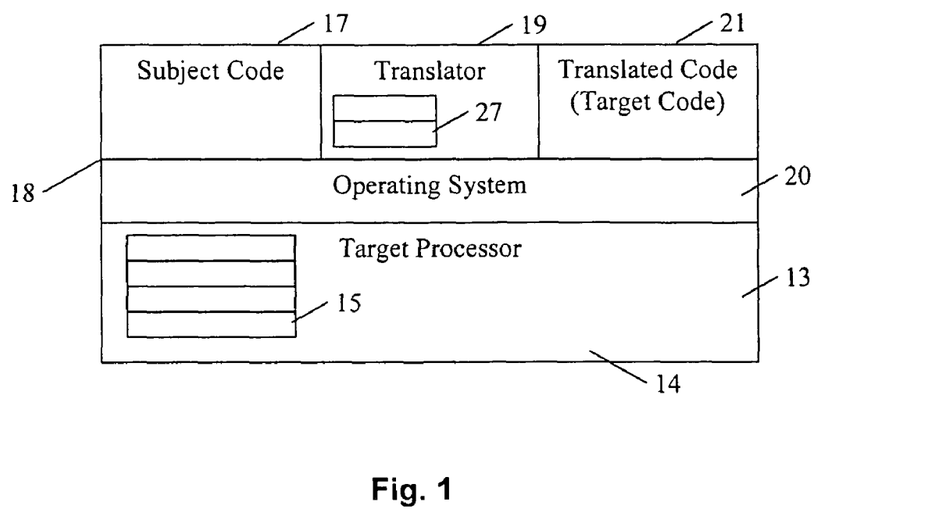
FIG. 1 is a block diagram illustrative of an apparatus wherein embodiments of the invention find application.

FIG. 1 illustrates an example target computing platform 14, comprising a target processor 13 including target registers 15 together with memory 18 storing a plurality of software components 17, 19, 20, 21, and 27. The software components include an operating system 20, subject code 17 to be translated, translator code 19, translated code (target code) 21, and an abstract register bank 27, amongst others.

In one embodiment, the translator code 19 is an emulator to translate subject code of a subject instruction set architecture (ISA) into translated target code of another ISA, with or without optimisations. That is, the translator 19 emulates a subject processor, whilst actually executing the subject program 17 as target code 21 on the target processor 13. In another embodiment, the translator 19 functions as an accelerator for translating subject code into target code, each of the same ISA, by performing program code optimisations.

In general terms, the target computing platform 14 is a translator apparatus, which includes inter alia a translation unit. 19 In the example embodiment, translator 19 is a compiled version of source code implementing the translator. The translator 19 and the translated code 21 produced by the translator 19 run in conjunction with the operating system 20 on the target processor 13, which is typically a microprocessor or other suitable computer.

It will be appreciated that the structure illustrated in FIG. 1 is exemplary only and that, for example, embodiments of the invention may be implemented in code residing within or beneath an operating system. The subject code 17, translator code 19, operating system 20, and storage mechanisms of the memory 18 may be any of a wide variety of types, as known to those skilled in the art.

In the apparatus according to FIG. 1, program code conversion is preferably performed dynamically, at run-time, while the target code 21 is running. The translator 19 runs inline with the translated program 21. In this case, the translator is a dynamic binary translator. In another example embodiment, the translator 19 is an interpreter which translates and executes individual subject instructions in turn as one or more corresponding target code instructions.

The translator 19 is preferably employed as an application compiled for the target architecture. The subject program 17 is translated by the translator 19 at run-time to execute on the target architecture 14. The subject program 17 is translated by the translator 19 at run-time to execute directly on the target architecture. The translator 19 also transforms subject operating system (OS) calls made by the subject program 17 so that they work correctly when passed to the target OS 20.

Running the subject program 17 through the translator 19 involves two different types of code that execute in an interleaved manner: the translator code 19; and the target code 21. The translator code 19 is generated such as by a compiler, prior to run-time, based on a high-level source code implementation of the translator 19. By contrast, the target code 21 is generated by the translator code 19, throughout run-time, based on the stored subject code 17 of the program being translated.

In the example embodiment, at least one abstract register bank 27 is provided (also referred to as the subject register bank 27 or global register store 27). In a multiprocessor environment, optionally more than one abstract register bank 27 is provided according to the architecture of the subject processor.

A representation of a subject processor state is provided by components of the translator 19 and the target code 21. That is, the translator 19 stores the subject processor state in a variety of explicit programming language devices such as variables and/or objects. The compiler used to compile the translator 19 determines how the state and operations are implemented in the translator code. The target code 21, by comparison, provides subject processor state implicitly in the target registers 15 and in memory locations 18, which are manipulated by the target instructions of the target code 21. For example, the low-level representation of the global register store 27 is simply a region of allocated memory. In the source code of the translator 19, however, the global register store 27 is a data array or an object which can be accessed and manipulated at a higher level.

Figure 2:
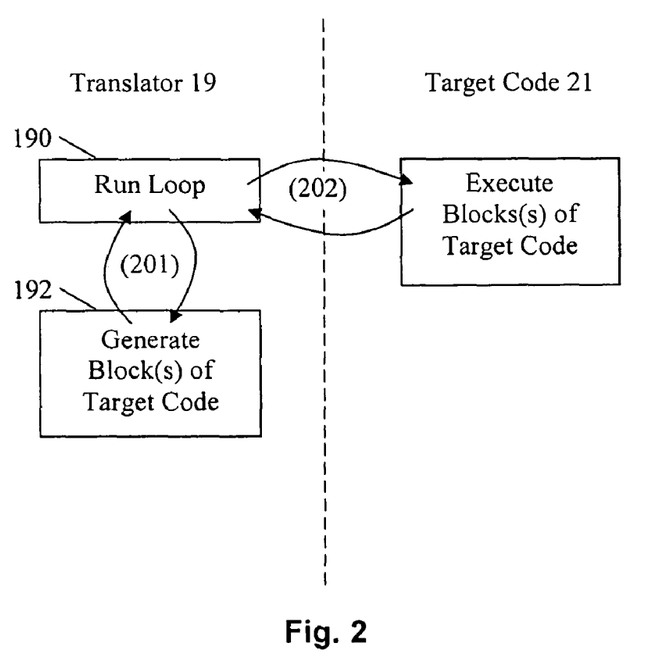
FIG. 2 is a schematic flow diagram illustrating an exemplary method of execution control during program code conversion.

FIG. 2 is a schematic flow diagram illustrating a example method of execution control during program code conversion.

As shown in FIG. 2, control initially resides with a translator control loop 190. In step 201, the control loop 190 calls a code generation function 192 of the translator code 19, which translates a block of the subject code 17 into a corresponding block of translated code 21. Then, in step 202, that block of translated code 21 is executed on the target processor 13. Conveniently, the end of each block of translated code 21 contains instructions to return control back to the control loop 201. In other words, the steps of translating and executing the subject code are interlaced, such that portions of the subject program 17 are translated and then executed in turn.

Here, the term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the example embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture ("subject register"). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator code generation function 192.

Figure 3:
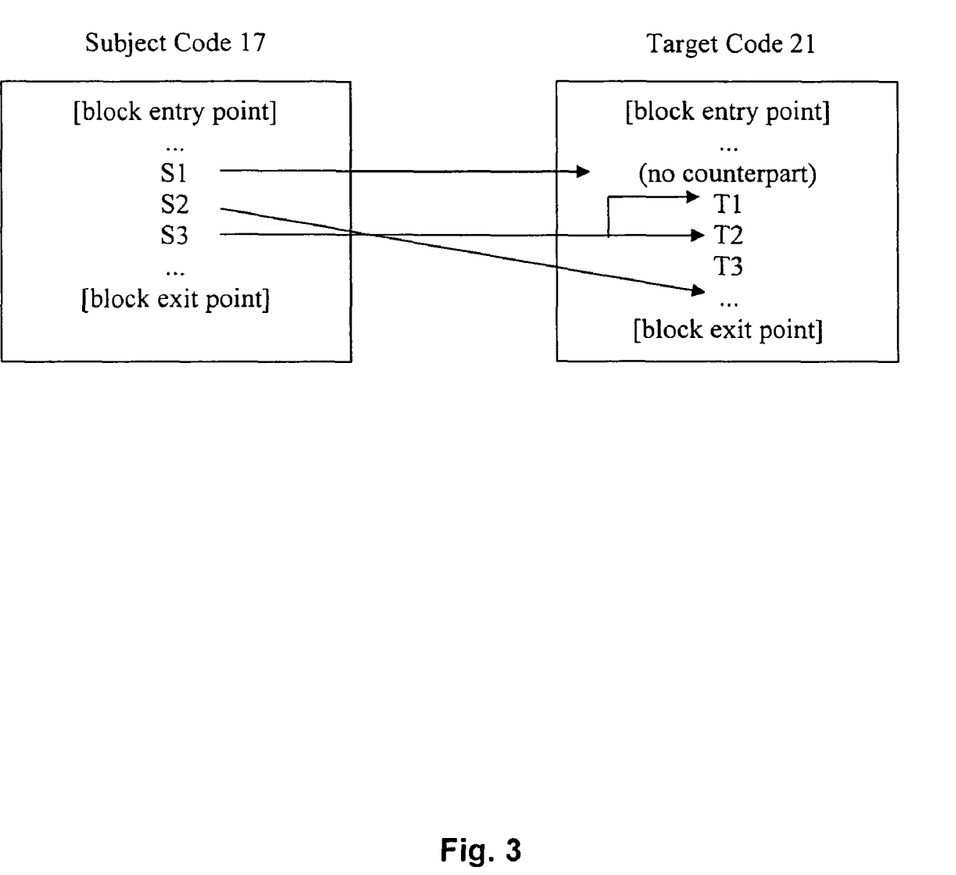
FIG. 3 is a schematic diagram to show a relationship between subject instruction and target instructions following program code conversion.

FIG. 3 is a schematic diagram to show an example relationship between instructions in a subject program and instructions in a target program, following program code conversion in example embodiments of the present invention.

In this example, subject instructions S1-S3 result in functionally equivalent target instructions T1-T3. The subject instruction S1 has been removed such as by a dead code elimination optimisation and has no counterpart in the generated target code. Subject instruction S2 results in one equivalent target instruction T3. By contrast, subject instruction S3 results in two target instructions T1 & T2. There may be a one to none, one to one, one to many or many to one relationship between the target and subject code instructions.

As also shown in FIG. 3, another commonly used optimisation is to perform code rescheduling, whereby an instruction sequence in the target code is not equivalent to the original sequence in the subject code. Here, the second subject instruction S2 has been rescheduled as the third target instruction T3.

Subject Access Coordination

Figure 4:
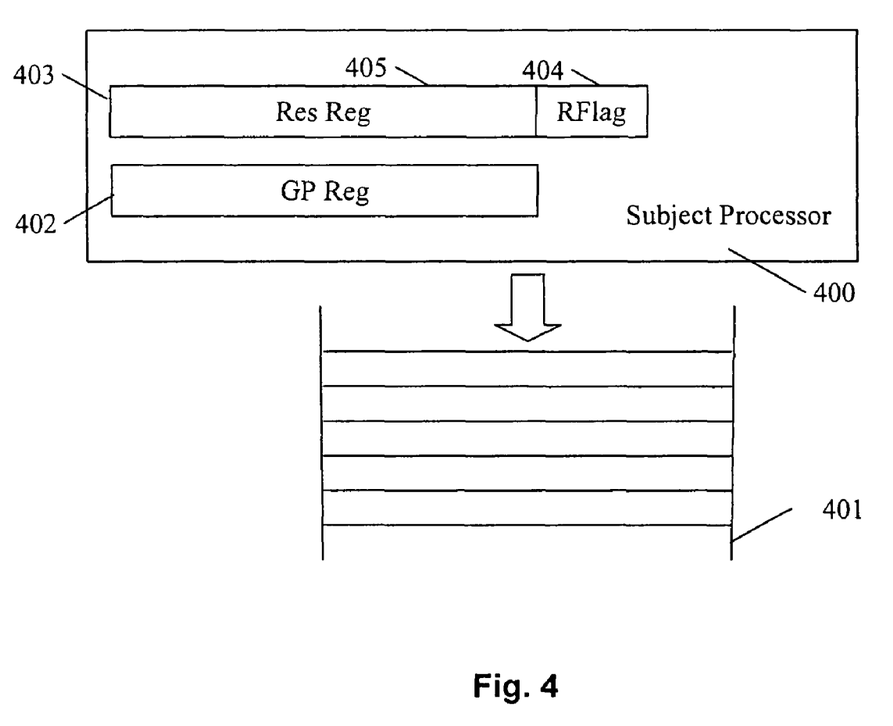
FIG. 4 is a schematic diagram of an example subject processor having a reservation as a hardware-oriented access coordination mechanism.

FIG. 4 is a schematic diagram of an example subject processor 400. The subject processor 400 has access to a memory 401, and includes at least one general purpose register 402, as will be familiar to those skilled in the art. The illustrated subject processor 400 is typical of a RISC processor.

In this example, the subject processor further includes an access coordination mechanism in the form of a reservation 403. Typically, the reservation 403 is part of the physical hardware of the subject processor 400. The reservation 403 provides an access coordination mechanism for a shared resource such as the memory 401. Usually only one reservation 403 is provided in the processor 400.

The reservation 403 is used to detect whether a potential interference has occurred in relation to the shared resource, namely the memory 401.

In this example, the reservation 403 comprises a reservation flag 404, and a special-purpose reservation register 405. The reservation flag 404 is typically a one-bit flag to show whether a reservation has been set or cleared. The reservation register 405 is used to store a memory address.

Most commonly, the reservation 403 is used in combination with "load-link" and "store-conditional" type instructions. The load-link instruction is used to set (or seal) the access coordination mechanism. The store-conditional instruction is used to check the access coordination mechanism, to detect potential interference with the shared resource.

Each of these instructions is associated with a specified address, in the example form:

```
retry:
    load-link [MEM LL]
    ... perform operations on the loaded data
    store-conditional [MEM SC]
    branch if store-conditional fails: retry
    ...
```

When a load-link type instruction is encountered, data is read from a memory address (i.e. [MEM LL]) associated with that instruction, the address [MEM LL] is written to the reservation register 404, and the reservation flag 405 is set.

The data read from the memory address can then be used in one or more operations (i.e. one or more intervening subject instructions). For example, incrementing, adding or bit-shifting operations are performed on the read data. Typically only a small number of operations are performed between corresponding load-link and store-conditional instructions, such as one, two or three instructions. This is to reduce the likelihood of interference. However, there is generally no limit on the number of instructions that can be performed between a pair of load-link and store-conditional instructions.

The store-conditional instruction is used to write the result of those intervening operations back to the memory 401, usually at the same memory address as the data was read from. That is, the load-link and store-conditional instructions are usually created in matched pairs such that [MEM LL] is the same address as [MEM SC].

The store-conditional instruction compares the given store address [MEM SC], against the address stored in the reservation register 404 (which should still be MEM LL). If the compared addresses are equal (i.e. MEM SC equals the stored MEM LL), and the reservation flag 405 is still set, then the store is performed.

In a multi-threaded environment, a potentially interfering event may have occurred elsewhere in the subject system (i.e. in another subject thread or on another subject processor). Here, a potentially interfering event is detected by either (a) the register flag 405 has been cleared when it should still be set, or (b) the address held in the reservation register 404 is not the same as the address (i.e. [MEM SC]) specified in the store-conditional instruction.

If the store-conditional instruction succeeded (i.e. no interference was detected), then the reservation flag 405 is cleared and program execution continues. However, if the store-conditional failed, then usually the program repeatedly loops back to the load-link instruction until the instructions are performed without interference.

As examples of potentially interfering events, the reservation flag 405 is typically cleared by interrupts, systems calls or any store to the memory address held in the reservation register 404.

As another example, a second load-link instruction (e.g. in another thread) will set the reservation flag 405, and alter the address stored in the reservation register 404 to the address (e.g. [MEM LL2]) associated with that second load-link instruction. The second load-link instruction will therefore cause the first store-conditional instruction to fail.

To allow the reservation 403 to function at high efficiency, logic gates for setting and checking the reservation register 404 and the reservation flag 405 are typically hard-wired into the subject processor 405. Similarly, logic gates for clearing the reservation flag 405 are typically hard-wired into the subject processor. This specially adapted hardware minimises the computational overhead associated with these procedures.

As a particular example, a PowerPC type processor provides a reservation and has an instruction set architecture which supports a pair of instructions for load-link & store-conditional functionality, known as "lwarx" and "stwcx". As further background to this example, a more detailed discussion is available at http://www-128.ibm.com/developerworks/library/pa-atom.

In this subject hardware-based reservation system, the reservation is blown (i.e. the flag 405 is cleared or the reservation register 404 altered) when an interrupt is received or a system call performed. Should a context switch take place between threads, a load-link in one thread of execution will not be matched by a store-conditional in another thread (which could cause a store to falsely take place) if the OS chooses to reschedule tasks (which will typically be performed upon interrupt or system call). As such, at a hardware level, one reservation is provided per processor, not per-software-task.

Target Access Coordination

Figure 5:
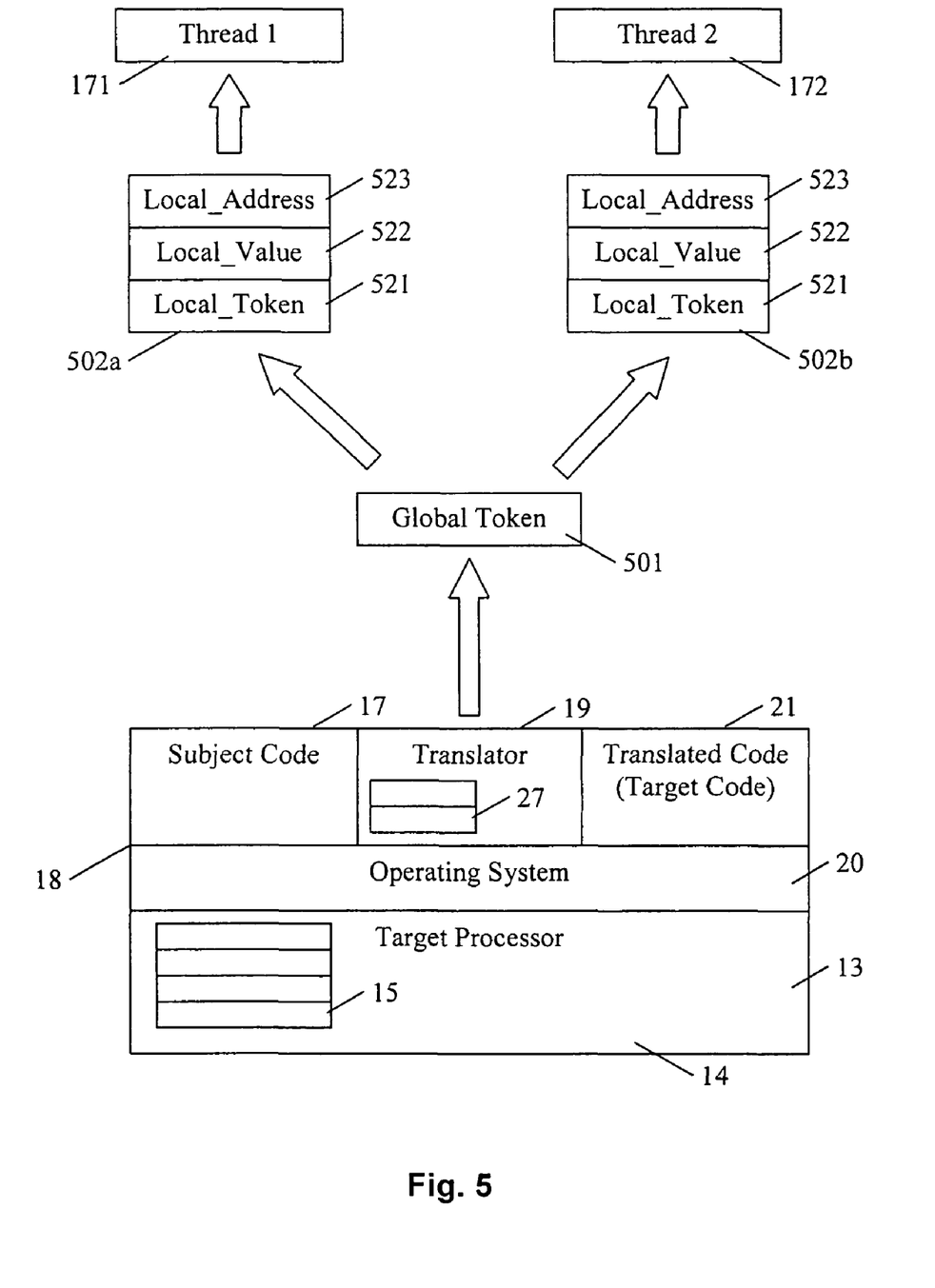
FIG. 5 is a schematic diagram of a target processor having an access coordination mechanism for a shared resource, as employed in exemplary embodiments of the present invention.

FIG. 5 is a schematic diagram of a target computing platform 14 which includes a mechanism for coordinating access to a shared resource, as employed in example embodiments of the present invention.

The translator 19 is arranged to support multiple threads in one or more subject programs 17. The translator 19 coordinates access to a shared resource such as the memory 18 by the multiple threads, and allows a potential interference to be detected.

Referring to FIG. 5, the translator 19 provides a global token 501, and one or more sets of local data 502, which together are employed to coordinate access to the memory 18.

In the example embodiment, the translator 19 provides one local data structure 502 for each thread of the subject program 17. FIG. 5 illustrates first and second data structures 502a, 502b associated with first and second threads 171, 172, respectively.

The access coordination mechanism (i.e. the global token 501 and each local data structure 502) is conveniently stored in the memory 18 as shown in FIG. 5. Alternatively, all or part of the data is stored in suitable registers 15 of target processor 13, if available. That is, the target code 21 may hold one or more elements of the access coordination data in a target register. In particular, the global token 501 is desirably held in a target register 15.

As shown in FIG. 5, each local data structure 502 comprises a local token 521, a local value 522 and a local memory address 523. The local token 521 stores a token, which is derived from the global token 501. The local value 522 stores a data value read from the shared resource (i.e. read from the memory 18). The local address 523 stores an address from which the data has been read.

The local address 523 is suitably formatted as a subject address representing a subject address space (e.g. as an address appropriate to the memory 401 of the subject system of FIG. 4). The subject address space is referred to by subject instructions 17. The translator 19 translates the subject address into a target address appropriate to the target computing system 14 and the target memory 18. Alternatively, the stored local address 523 is formatted as the translated target address.

Figure 6:
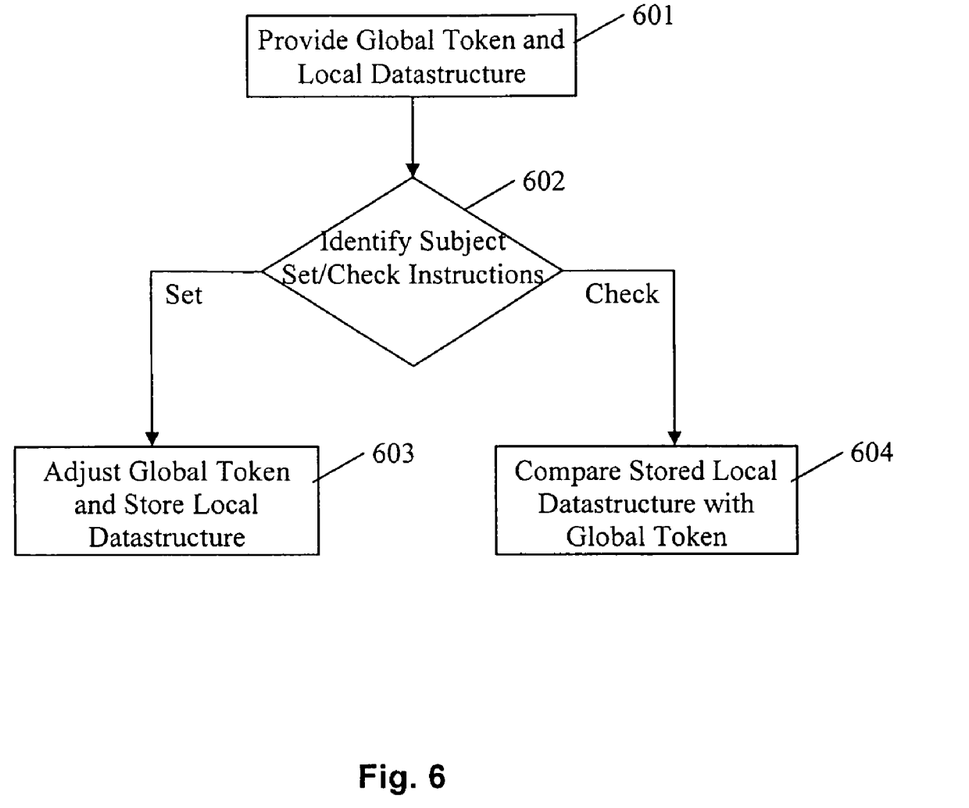
FIG. 6 is an overview of a method employed in exemplary embodiments of the present invention.

FIG. 6 is an overview of a preferred method of providing an access coordination mechanism as employed in embodiments of the present invention. The method is suitably performed in the translator 19, which generates target code 21 to implement the method on the target processor 13.

Referring to FIG. 6, the method includes the step 601 of providing the global token 501 and at least one local datastructure 502, as discussed above referring to FIG. 5.

Step 602 comprises decoding the subject program 17 to identify instructions that refer to a subject access coordination mechanism (i.e. the access coordination mechanism 403 provided in the subject processor 400 of FIG. 4). In particular, this step comprises identifying (a) a subject setting instruction which sets the subject access coordination mechanism (such as a load-link instruction), and (b) a subject checking instructions which checks the subject access coordination mechanism (such as a store-conditional instruction).

Step 603 comprises (a) in response to the subject setting instruction, adjusting the global token 501, and storing the local datastructure 502 for a first thread 171. Here, the local token 521, local value 522 and local address 523 are written into the local datastructure 502 (e.g. in the memory 18) by target code when a subject load-link instruction is encountered.

Step 604 comprises (b) in response to the subject checking instruction, comparing the stored local datastructure 502 against at least a current value of the global token 501 to determine potential interference with the shared resource 18. The comparing step also compares data provided in the checking instruction against the local datastructure 502. Further, the step 604 comprises adjusting the global token 501.

Figure 7:
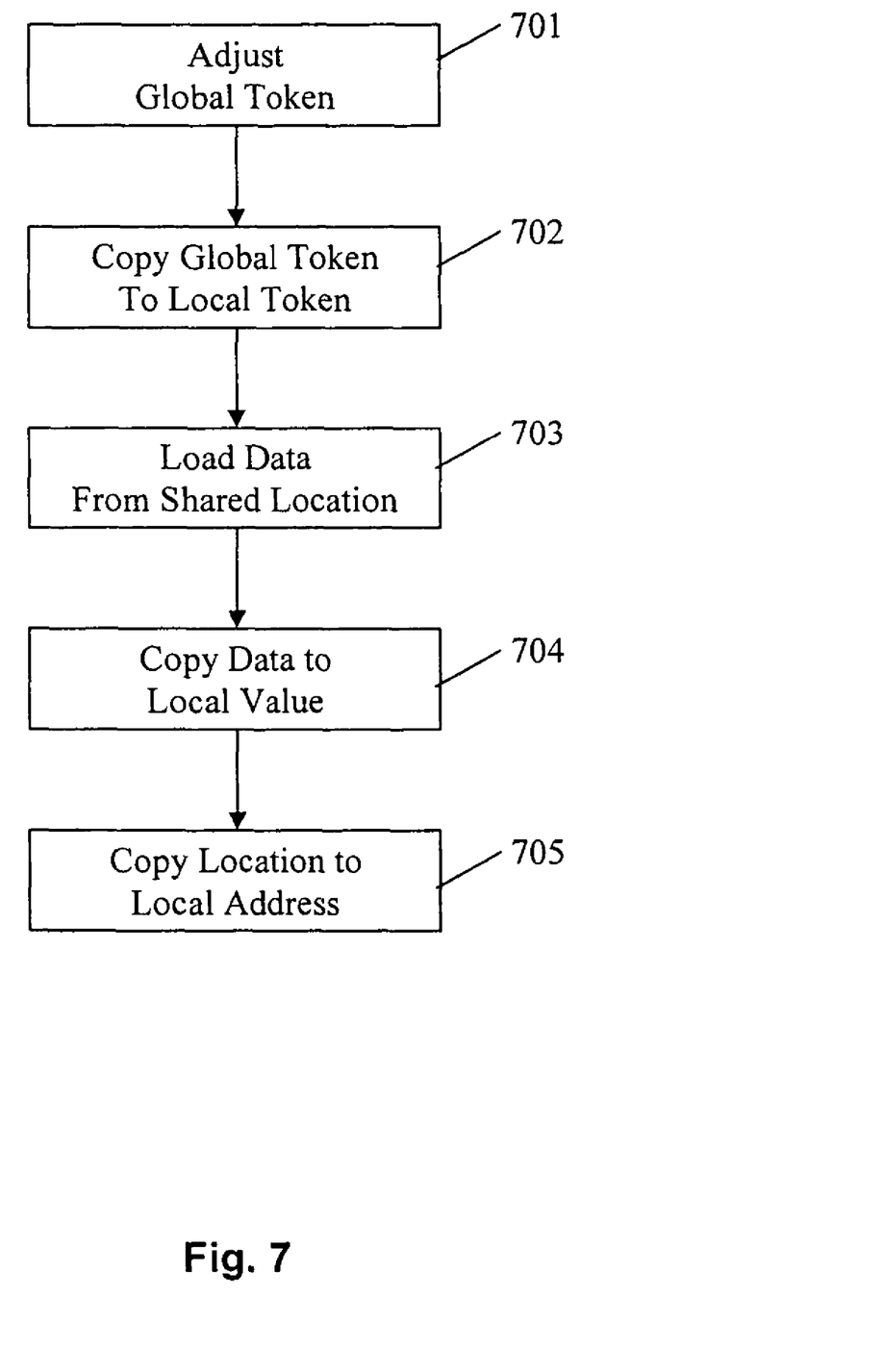
FIG. 7 is a schematic flow diagram illustrating the method of FIG. 6 in more detail.

FIG. 7 is a schematic flow diagram illustrating step 603 of FIG. 6 in more detail.

The translator 19 identifies the subject setting instruction, such as the subject code load-link instruction load-link [MEM LL] which operates on the subject reservation 403. The corresponding target code 21 produced by the translator performs the steps illustrated in FIG. 7. Briefly, FIG. 7 shows the step 701 of adjusting the global token 501, the step 703 of reading data from the shared resource, and steps 702, 704 and 705 of storing the local datastructure 502.

The step 701 comprises adjusting the global token 501. Suitably, the global token is a numerical value, such as a 64-bit numerical counter, and adjusting the global token is an arithmetic operation. Most conveniently, adjusting the global token 501 comprises incrementing the counter. An increment instruction is performed relatively inexpensively in many target processors 13. Alternatively, the counter is decremented. Other forms of adjustment are also possible. The adjustment shows that the global token has changed from its previous form or value. Also, the global token will change again in response to subsequent adjustments.

Ideally, the operation or operations to adjust the global token 501 are themselves performed without interference. Otherwise, there is no guarantee that the global token 501 is correctly adjusted. In particular, the translator 19 itself may be running on the target processor as one thread amongst a plurality of target threads.

Suitably, the global token 501 is adjusted without interference, using a mechanism appropriate to the target processor. Ideally, an atomic operation is used, if such exist in the instruction set architecture target processor, or by using a target processor's own load-link and store-conditional mechanism, if such exists.

Some instruction set architectures support operations that read data from memory, operate on the data and write the results back into memory as a single step. Such operations do not comprise separate sub-steps, and therefore cannot be broken down. Operations of this type are known as "atomic" because of their logical indivisibility. Usually, an atomic operation occurs in the processor in a single bus cycle. Logically, any other attempts to operate on the data must take place either before or after the atomic operation.

Atomic operations are commonly provided on CISC processors. As a particular example, where the target processor comprises an x86-family processor, adjusting the global token 501 comprises incrementing a global token counter using an atomic compare-exchange type instruction (e.g. a "cmpxchg" instruction).

The step 702 comprises storing the current value of the global token 501 as the local token 521 of the local datastructure 502.

The step 703 comprises loading data from a memory location specified in the subject load-link instruction (i.e. a location in the target memory 18 relating to the subject address [MEM LL]). That is, the subject setting instruction provides a setting address in relation to the shared resource, and a data value is read from the shared resource in response to the setting address (i.e. with appropriate address transformation if needed).

The steps 704 and 705 comprise storing a copy of the loaded data and the setting address (e.g. MEM LL), as the local value 522 and the local address, respectively, in the local datastructure 502.

Generic pseudo code for implementing steps 701 to 705 is:

```
[atomically] adjust global token
load [MEM LL]
local_token = global token
local_mem = MEM LL
local_value = value in MEM LL
```

Figure 8:
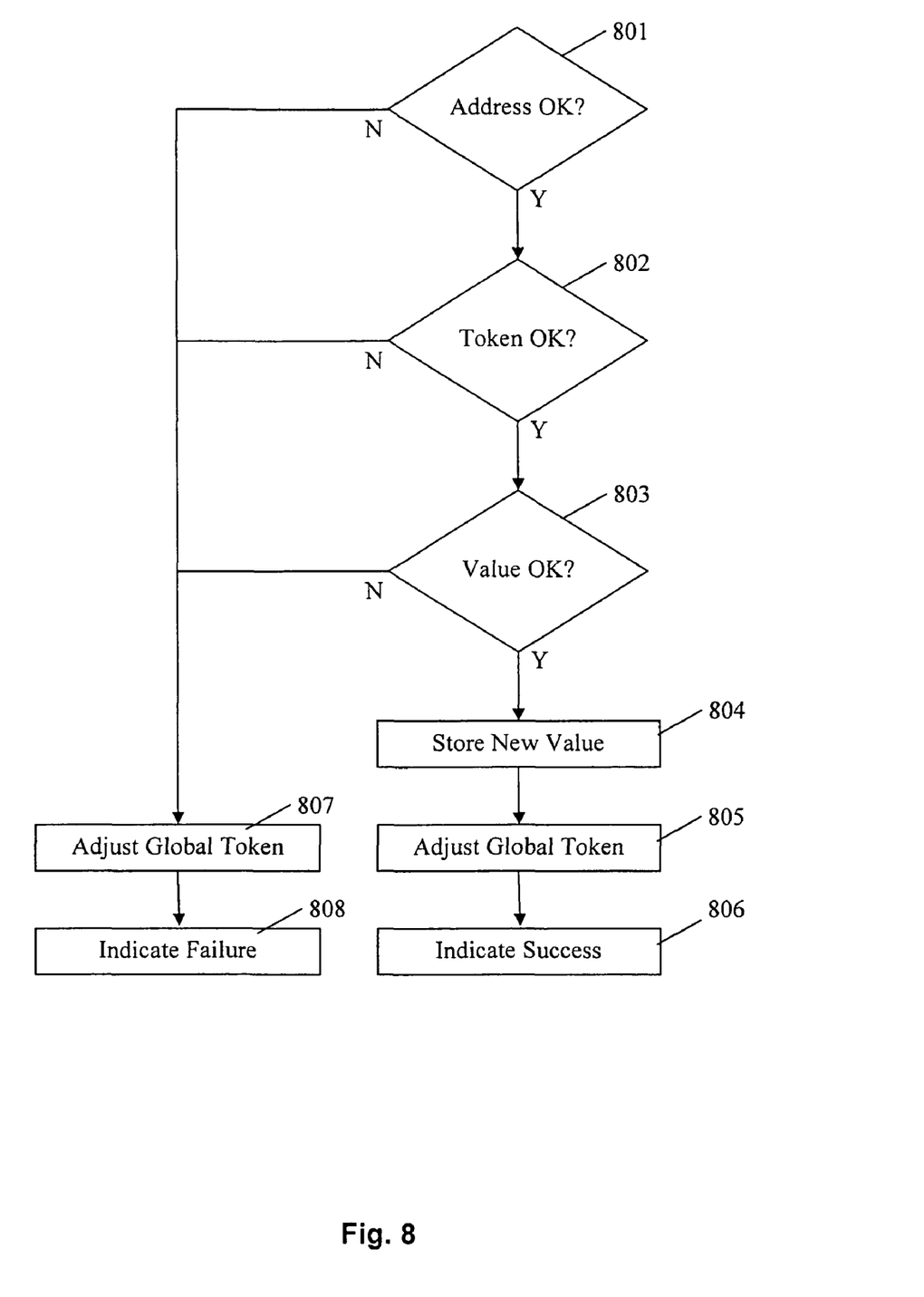
FIG. 8 is a schematic flow diagram illustrating the method of FIG. 6 in more detail.

FIG. 8 is a schematic flow diagram illustrating step 604 of FIG. 6 in more detail.

The subject code store-conditional instruction is conveniently divided into several sub-steps in target code, as illustrated in FIG. 8.

Step 801 comprises comparing a checking address (i.e. [MEM SC]) derived from an address specified in the subject store-conditional instruction against the local address 523 stored in the local datastructure 502. Again, address transformation is performed if needed. A successful compare (where the checking address and the stored local address are identical) shows that the subject store-conditional instruction matches with the preceding load-link instruction. A failed compare (where the addresses are not identical) indicates that another load-link instruction has been executed in the current thread 171. Such a situation can arise unintentionally in poorly written subject code. Here, there is no guarantee that the intervening instructions between the first load-link and the corresponding store-conditional have been performed without interference.

The step 802 comprises comparing the stored local token 521 against the current value of the global token 501. If the local token 521 is not equal to the global token 501, then the global token 501 has likely been adjusted by potentially interfering instructions in another thread 172 (or even in the present thread 171). For example, another thread may have performed an interfering load-link type setting instruction. In this case there is no guarantee that the intervening operations since the local token 521 was stored have been performed without interference.

Other target code instructions can be set up to adjust the global token 501, ideally using an atomic operation such as [atomically] adjust global token as discussed above. For example, stores, system calls or interrupts on the subject processor would normally clear the subject processor's reservation flag 405. These subject processor events and instructions are ideally translated into target code which adjusts the global token 501.

In step 803, the value 522 stored as local value is compared with the value currently stored in the memory location ([MEM SC]) specified in the subject checking instruction (store-conditional instruction). If the values are not identical, this shows that another store has taken place on that memory location. Hence, it is detected that the intervening instructions between the subject setting and checking instructions have not been performed without interference.

There is the possibility that, coincidentally, the value 522 of local value corresponds to that of another store instruction which last wrote to the relevant memory address. However, this additional check means that a false positive is obtained only where both the global token has been adjusted to an expected value, and the same value has been stored.

Ideally, the checks of steps 801-803 are performed in combination. These three checks together provide a robust but relatively inexpensive mechanism to detect potential interference in relation to a shared resource such as memory, in a multi-threaded environment.

Step 804 comprises performing the store requested by the subject checking instruction (i.e. the store-conditional instruction). That is, where each of the comparisons of steps 801, 802 and 803 was successful, the result of the intervening operations is stored to the location ([MEM SC]) specified in the subject checking instruction.

Step 805 comprises adjusting the global token such as with an atomic increment (e.g. compare-exchange) instruction, as discussed above for step 701.

Step 806 comprises indicating that the checking and storing operation was successful, such that operation of the subject program may now continue. For example, a success/fail flag is provided and referred to by the target code 21 or the translator 19.

Steps 807 and 808 are reached where any of the compare operations of steps 801-803 are not successful (fail).

Step 807 comprises adjusting the global token such as with an atomic increment (e.g. compare-exchange) instruction, as discussed above for step 701.

Step 808 comprises indicating that the checking and storing operation failed. For example, a success/fail flag is set to indicate a fail and is referred to by the target code 21 or the translator 19. Ideally, the success/fail flag is used to branch back and retry the whole sequence from the corresponding load-link instruction.

Example program instructions for steps 801-808 are shown below in generic pseudo code:

```
If ((local mem == MEM SC)
    and (local token == global token)
    and (local value == contents of MEM SC))
then:
    perform store [MEM SC]
    [atomically] adjust global token
    set success flag
else
    [atomically] adjust global token
    set failure flag
```

The example embodiments discussed herein have many benefits and advantages. The embodiments discussed herein advantageously provide a soft-oriented approach to access coordination, which is still relatively efficient and cost-effective to implement in a translator and to execute as target code.

The examples given herein are generic, and the principles of the present invention apply to all combinations of subject and target processors where subject code setting and checking instructions (e.g. load-link and store-conditional instructions) are to be executed on an architecture that uses a different access coordination mechanism, or that provides no such mechanism. In particular, the example embodiments allow a behaviour equivalent to a hardware-oriented reservation to be performed efficiently on target processors that do not provide hardware support for a reservation.

As particular, non-limiting, examples, PowerPC and MIPS type processors provide load-link & store-conditional mechanisms using a hardware-supported reservation. By contrast, x86, Itanium and Sparc type processors do not provide a reservation. In the preferred embodiments these processors are able to perform atomic operations on memory relatively inexpensively.

The principles discussed herein can also be applied where subject and target processors both have load-link & store-conditional mechanisms, but where there is not a direct mapping between those mechanisms. Further, in cases where the subject and target processors both have load-link & store-conditional mechanism, it is still desirable to keep the target processor reservation independent of load-link & store-conditional instructions in subject code. This is because the translator is also running on the target processor, and will itself make use of the target processor's reservation. In this way interference between the translator and the translated target code can be reduced.

As discussed above, the example embodiments of the present invention are based around the observation that, at the software layer, detecting reschedule events such as interrupts or system calls may be difficult or expensive. However, storing information per-thread is less expensive. The preferred design is based around storing, per-thread, three pieces of information, namely a flag indicating that an access coordination mechanism is set, the address loaded from, and the loaded value. The flag is cleared (i.e. set to indicate a fail condition) should a system call occur within this thread, or an interrupt occur which is handled through the translator.

The value is used to detect when the relevant memory content has changed at the point of the store-conditional checking instruction following the load-link setting instruction. Ideally, the system should not just detect whether the value is the same on store-conditional as it was at the point of the load-link, it should also detect any intervening changes. Detecting these from software is potentially prohibitively expensive.

In practice, a given memory address is typically only accessed by atomic or non-atomic instructions. As such, it is sufficient to cause store-conditional instructions to invalidate all access coordination mechanisms in the system. This will potentially cause an access coordination mechanism to be invalidated unnecessarily, but this can happen anyway (e.g. where a thread receives a hardware interrupt between a load-link and store-conditional, but no intervening event interferes with the atomicity of the operation taking place). In order to make a store-conditional instruction break an access coordination mechanism elsewhere in the system, example embodiments of the present invention move from a pure per-thread model as described above, which just features a one-bit flag to indicate reservation held, to a model introducing the global token. The per-thread flag is provided as a per-thread local token. The advantage of this is that all access coordination mechanisms in all other threads are caused to fail just by modifying the one single global token, rather than attempting to update flags in all threads in the system.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of providing an access coordination mechanism of a shared resource, comprising:
   (a) providing a plurality of local datastructures each associated with one of the multiple subject threads, and a global token common to each of the subject threads, wherein the multiple subject threads are executable on a subject processor, corresponding to a first processor type;
   (b) decoding the subject code to identify a subject setting instruction which sets a subject access coordination mechanism in relation to a shared resource, and a subject checking instruction which checks the subject access coordination mechanism;
   (c) in response to the subject setting instruction, generating target code for adjusting the global token, and storing at least a local token in the local datastructure for a current thread, wherein the local token is derived from the adjusted global token;
   (d) in response to the subject checking instruction, generating target code for execution on a target processor, corresponding to a second processor type, for comparing at least the stored local token against the global token to determine potential interference with the shared resource; and
   (e) in response to the comparison, clearing a reservation flag associated with the global token if a store-conditional instruction succeeded;
   wherein the first processor type is a different processor type than the second processor type.

2. The method of claim 1, further comprising adjusting the global token in response to an event which potentially interferes with the shared resource.

3. The method of claim 2, further comprising:
   detecting a system call from the subject code or an interrupt affecting the subject
   code, and in response adjusting the global token to show potential interference with the shared resource.

4. The method of claim 1, further comprising:
performing (c) in relation to a first subject thread;
adjusting the global token in relation to a second subject thread; and
performing (d) in relation to the first subject thread, thereby determining potential interference with the shared resource by the second subject thread.

5. The method of claim 1, wherein:
said (c) further comprises storing data derived from the subject setting instruction into the local datastructure; and
said (d) further comprises comparing data derived from the subject checking instruction against data from the local datastructure.

6. The method of claim 1, wherein:
said (c) further comprises storing in the local datastructure a local address derived from a setting address specified in the subject setting instruction for reading from the shared resource; and,
said (d) further comprises comparing the local address against a checking address derived from the subject checking instruction.

7. The method of claim 1, wherein:
said (c) further comprises storing in the local datastructure a local value which stores a data value read from the shared resource with respect to a setting address specified in the subject setting instruction; and
said (d) further comprises comparing the local value against data value read from the shared resource with respect to a checking address specified in the subject checking instruction.

8. The method of claim 1, wherein:
said (c) further comprises:
storing in the local datastructure a local address derived from a setting address specified in the subject setting instruction for reading from the shared resource, and a local value which stores a data value read from the shared resource with respect to the setting address; and
said (d) further comprises:
comparing the local address against a checking address derived from the subject checking instruction; and
comparing the local value against data value read from the shared resource with respect to the checking address.

9. The method of claim 1, wherein said (d) further comprises storing a new data value to the shared resource in response to the subject checking instruction.

10. The method of claim 1, wherein said (d) further comprises adjusting the global token.

11. The method of claim 1, wherein the global token is a numerical counter value.

12. The method of claim 11, wherein storing the local token comprises copying a current value of the global token.

13. The method of claim 11, wherein adjusting the global token comprises incrementing the counter.

14. The method of claim 1, comprising adjusting the global token atomically on the target processor.

15. The method of claim 1, comprising translating subject code executable by a subject processor into the target code executable by the target processor.

16. The method of claim 15, comprising performing dynamic binary translation from the subject code into the target code.

17. The method of claim 15, wherein the target processor comprises a different type of processor to the subject processor.

18. A translator apparatus to perform program code conversion from subject code executable by a subject processor, corresponding to a first processor type, into target code executable by a target processor, corresponding to a second processor type, the apparatus comprising:
the target processor having a memory storing a translation unit to translate subject code executable on a subject processor into translated target code for execution on the target processor, wherein the subject code includes multiple subject threads, wherein the translator unit
a) provides a plurality of local datastructures each associated with one of the multiple subject threads, and a global token common to each of the subject threads;
b) decodes the subject code to identify a subject setting instruction which sets a subject access coordination mechanism in relation to a shared resource, and a subject checking instruction which checks the subject access coordination mechanism;
c) in response to the subject setting instruction, generates target code for adjusting the global token, and storing at least a local token in the local datastructure for a current thread, wherein the local token is derived from the adjusted global token;
d) in response to the subject checking instruction, generates target code for comparing at least the stored local token against the global token to determine potential interference with the shared resource; and
(e) in response to the comparison, clearing a reservation flag associated with the global token if a store-conditional instruction succeeded; and
wherein the first processor type is a different processor type than the second processor type.

19. The translator apparatus of claim 18, wherein the translation unit is arranged to adjust the global token in response to an even which potentially interferes with the shared resource.

20. The translator apparatus 19, wherein the translation unit is arranged to detect a system call from the subject code or an interrupt affecting the subject code, and in response adjust the global token to show potential interference with the shared resource.

21. The translator apparatus of claim 18, wherein the translation unit is arranged to perform said (c) in relation to a first, subject thread; adjust the global token in relation to a second subject thread; and perform said (d) in relation to the first subject thread, thereby determining potential interference with the shared resource by the second subject thread.

22. The translator apparatus of claim 18, wherein the translation unit is arranged to store data derived from the subject setting instruction into the local datastructure; and compare data derived from the subject checking instruction against data from the local datastructure.

23. The translator apparatus of claim 18, wherein the translation unit is arranged to store in the local datastructure a local address derived from a setting address specified in the subject setting instruction for reading from the shared resource; and compare the local address against a checking address derived from the subject checking instruction.

24. The translator apparatus of claim 18, wherein the translation unit is arranged to store in the local datastructure a local value which stores a data value read from the shared resource with respect to a setting address specified in the subject setting instruction; and compare the local value against data value read from the shared resource with respect to a checking address specified in the subject checking instruction.

25. The translator apparatus of claim 18, wherein the translation unit is arranged to store in the local datastructure a local address derived from a setting address specified in the subject setting instruction for reading from the shared resource, and a local value which stores a data value read from the shared resource with respect to the setting address: compare the local address against a checking address derived from the subject checking instruction; and compare the local value against data value read from the shared resource with respect to the checking address.

26. The translator apparatus of claim 18, wherein the translation unit is arranged to store a new data value to the shared resource in response to the subject checking instruction translator apparatus.

27. The translator apparatus of claim 18, wherein the translation unit is arranged at said (d) to adjust the global token.

28. The translator apparatus of claim 18, wherein the global token is a numerical counter value.

29. The translator apparatus of claim 28, wherein the translation unit is arranged to store the local token by copying a current value of the global token.

30. The translator apparatus of claim 28, wherein the translation unit is arranged to adjust the global token by incrementing a counter.

31. The translator apparatus of claim 18, wherein the translation unit is arranged to adjust the global token atomically on the target processor.

32. The translator apparatus of claim 18, wherein the translation unit is arranged to perform dynamic binary translation from the subject code into the target code.

33. The translator apparatus of claim 18, wherein the target processor comprises a different type of processor to the subject processor.

34. A computer-readable medium having recorded thereon instructions implementable by a computer to perform the method of providing an access coordination mechanism of a shared resource, for use in program code conversion from subject code having multiple subject threads into target code executable by a target processor, corresponding to a first processor type, the method including:
  (a) providing a plurality of local datastructures each associated with one of the multiple subject threads, and a global token common to each of the subject threads, wherein the subject treads are executable on a subject processor, corresponding to a second processor type;
  (b) decoding the subject code to identify a subject setting instruction which sets a subject access coordination mechanism in relation to a shared resource, and a subject checking instruction which checks the subject access coordination mechanism;
  (c) in response to the subject setting instruction, generating target code, executable on the target processor, for adjusting the global token, and storing at least a local token in the local datastructure for a current thread, wherein the local token is derived from the adjusted global token;
  (d) in response to the subject checking instruction, generating target code for comparing at least the stored local token against the global token to determine potential interference with the shared resource; and
  (e) in response to the comparison, clearing a reservation flag associated with the global token if a store-conditional instruction succeeded;
  wherein the first processor type is a different processor type than the second processor type.

* * * * *